(12) United States Patent
Chen

(10) Patent No.: US 6,522,537 B2
(45) Date of Patent: Feb. 18, 2003

(54) SNAP-IN COMPUTER CASING STRUCTURE

(75) Inventor: Chih-Chung Chen, Taipei (TW)

(73) Assignee: Portwell Inc., Taipei (TW)

( * ) Notice: Subject to any disclaimer, the term of this patent is extended or adjusted under 35 U.S.C. 154(b) by 27 days.

(21) Appl. No.: 09/906,774

(22) Filed: Jul. 18, 2001

(65) Prior Publication Data

US 2003/0016494 A1 Jan. 23, 2003

(51) Int. Cl.$^7$ .................................................. H05K 7/20
(52) U.S. Cl. ...................... 361/687; 361/695; 165/80.4; 174/15.2
(58) Field of Search ................................ 361/687, 726, 361/699, 700, 704, 709, 710, 695–698; 165/80.2–80.4, 185; 174/15.1, 15.2, 16.3

(56) References Cited

U.S. PATENT DOCUMENTS

| | | | | |
|---|---|---|---|---|
| 5,119,270 A | * | 6/1992 | Bolton et al. ............... | 361/687 |
| 5,864,464 A | * | 1/1999 | Lin .............................. | 361/697 |
| 6,108,196 A | * | 8/2000 | Jung ........................... | 361/683 |
| 6,411,511 B1 | * | 6/2002 | Chen ........................... | 361/697 |

* cited by examiner

*Primary Examiner*—Darren Schuberg
*Assistant Examiner*—Hung Van Duong
(74) *Attorney, Agent, or Firm*—Troxell Law Office PLLC

(57) ABSTRACT

The present invention relates to a snap-in computer casing structure, wherein at least a set of sliding track and sliding groove being disposed in the external casing of the casing passing through the external casing and not on the same plane. A fan frame is disposed on the back panel, and the fan frame has a plurality of penetrating holes for inserting the inclined board such that the panel in front of the hard disk drive frame presses the fan frame at a fixed angle, and a plurality of openings being disposed at the back panel for the connection of different ports. In the preferred embodiment, the floppy disk mounted on the disk drive frame and the motherboard coupled to the hard disk drive by a fixing post are pushed into the sliding track and the sliding groove in order to facilitate a quick unload.

5 Claims, 6 Drawing Sheets

SNAP-IN COMPUTER CASING STRUCTURE

BACKGROUND OF THE INVENTION

1. Field of the Invention

The present invention relates to a snap-in computer casing structure, more particularly to a computer casing that carries special functions and features a quick assembly and disassembly structure. The computer casing according to the present invention comprises at least one motherboard and a hard disk drive, and an interface port which is disposed parallel to the motherboard, and it works together with special software to execute at least one special function such as the firewall or email server, printer server, or acting server, etc.

2. Description of the Prior Art

In FIG. 1, it shows the traditional computer casing, and the external casing 11 of the computer casing 10 has at least one hard disk drive 20 and at least one motherboard 30, and a plurality of I/O ports 121 of different functions are disposed at the back panel 12 of the casing 10. Since when the hard disk drive 20 and the motherboard 30 in the casing 10 need to be maintained, repaired, or replaced, it takes a lot of efforts to unscrew the components 13~15 by tools in order to remove the external casing 11, motherboard 30, and hard disk drive 20 from the retainer frame 16 for the maintenance and repair work. Even after the maintenance and repair, the external casing 11, motherboard 30, and hard disk drive 20 are mounted to the retainer frame 16 by screwing the components 13~15 by tools. The whole process is troublesome and time-consuming.

In view of the shortcomings of the prior art mentioned above, which are the subjects of improvements for a long time, hence the inventor of the present invention based on years of experience accumulated from the engagement in the related industry conducted extensive research to resolve the foregoing shortcomings and invented the present invention.

Therefore, the primary objective of the present invention is to maintain and repair the hard disk drive or motherboard in the casing quickly by means of having a set of sliding tracks for both side of the hard disk drive and at least a set of sliding groove for the motherboard, and the external casing proximate to the inner edge having a latch groove for latching the elastic latch on the back panel periphery of the casing. A fan frame is disposed on the back panel, and the fan frame has a plurality of penetrating holes for inserting the inclined board such that the front panel in front of the hard disk drive frame presses the fan frame at a fixed angle, and a plurality of openings being disposed at the back panel for the connection of different ports such as USB port, networking port, VGA port, PS/2 mouse, etc. Such arrangement allows the hard disk drive mounted on the hard disk drive frame and the motherboard, which is electrically coupled to the hard disk drive to be pushed into the external casing for fixing into position.

To make it easier for our examiner to understand the objective of the invention, structure, innovative features, and performance, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DESCRIPTION OF THE PREFERRED EMBODIMENT

Figure 1:
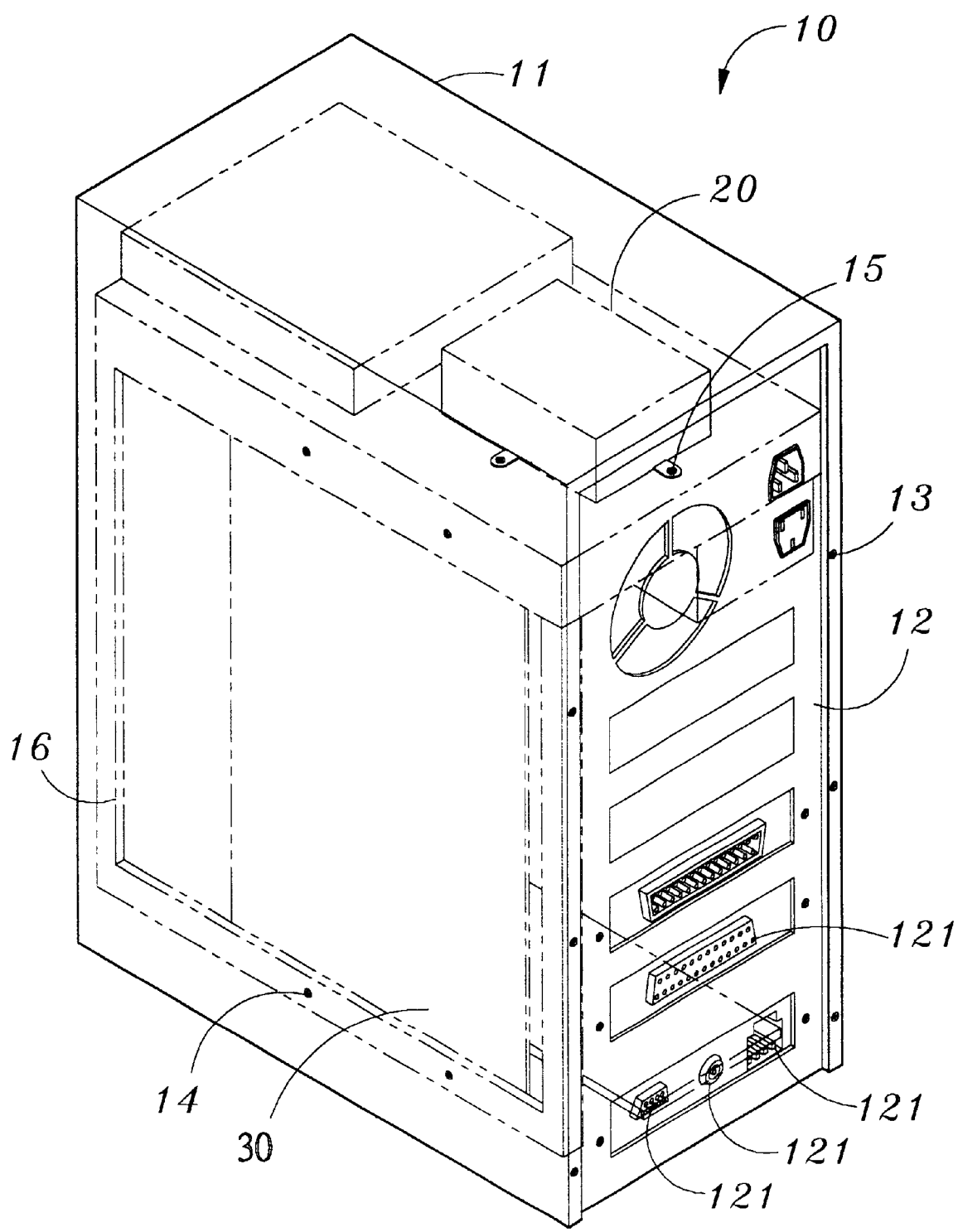
FIG. 1 shows a three-dimensional structure of a prior-art computer casing.
Figure 2:
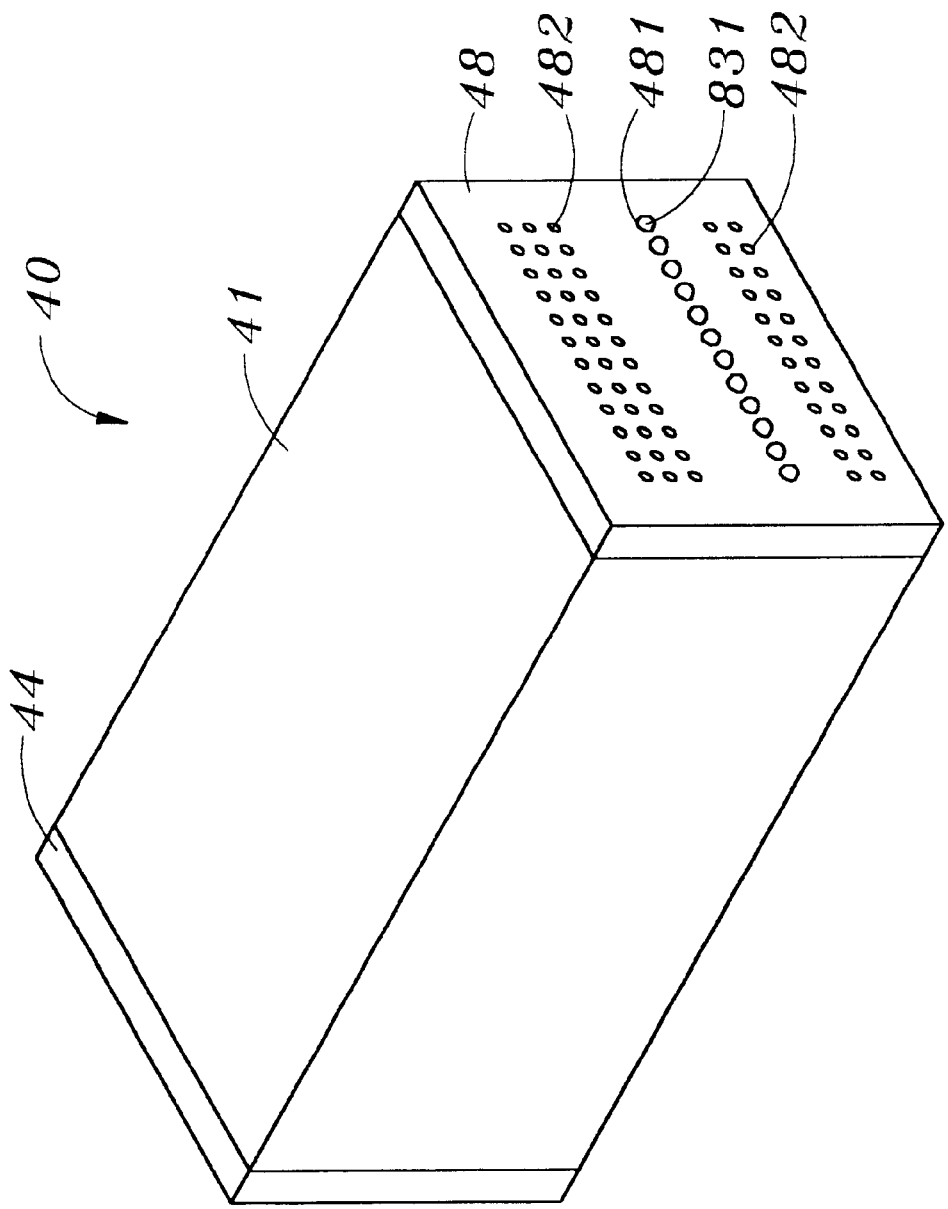
FIG. 2 shows a three-dimensional structure of a computer casing according to the present invention.
Figure 3:
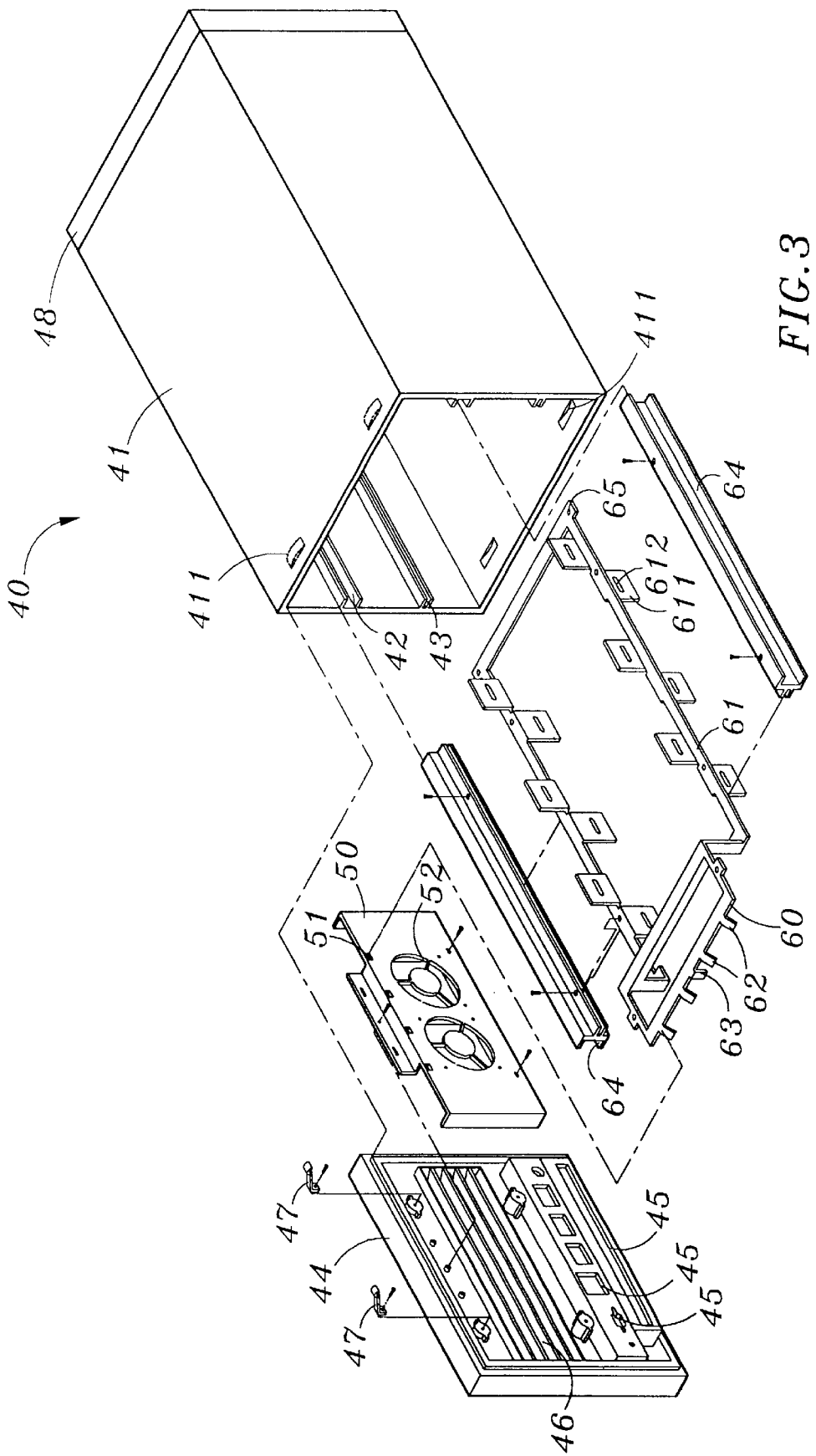
FIG. 3 shows the disassembled parts of the structure according to the present invention.

Please refer to FIGS. 2 and 3 at the same time, these diagrams show a snap-in computer casing structure comprising a casing 40, a fan frame 50, and a hard disk drive frame 60; wherein the external casing 41 of the casing 40 is a frame member, and both ends of the external casing 41 have a corresponding front panel 48 and back panel 44. The back panel has a plurality of openings 45 and ventilation holes 46, and an elastic latch 47. In the external casing 41, there is at least one set of sliding track 42 and sliding groove 43 passing through the external casing 41 in different planes. The casing proximate to the inner edge of the end surface has a latch groove 411 collaborating with an elastic latch 47 such that the front panel 48 and the back panel 44 are latched on the latch groove 411 and coupled to the external casing 41 and further fixed on both ends of the external casing 41 as shown in FIG. 4.

Further, the fan frame 50 is mounted on the back panel 44 by screws, and the fan frame 50 has a plurality of penetrating holes 51 and a plurality of airflow guiding holes 52 which exactly face the ventilation holes 46 on the back panel 44.

Furthermore, the hard disk drive frame 60 is a vertical board having a hollow ventilation section extended horizontally below the frame 60, and a horizontal surrounding board 61 being extended at the rear, and a plurality of inclined boards 62 being disposed at the front end of the hard disk drive frame 60 can be inserted into the penetrating hole 51 of the fan frame 50, and a panel 63 is also disposed at the front end of the hard disk drive frame 60 capable of pressing the fan frame 50 with a certain angle, and a plurality of corresponding vertical boards 611 being disposed on the upper and the lower sections of the inner edge of the horizontal surrounding boards 61. The vertical board 611 has a long hole 612, and a screw hole 65 is disposed at one end of the horizontal surrounding board 61, and a sliding track 64 capable of sliding on a sliding track 42 of the external casing 41 is disposed on each side of the horizontal surrounding board 61.

Figure 4:
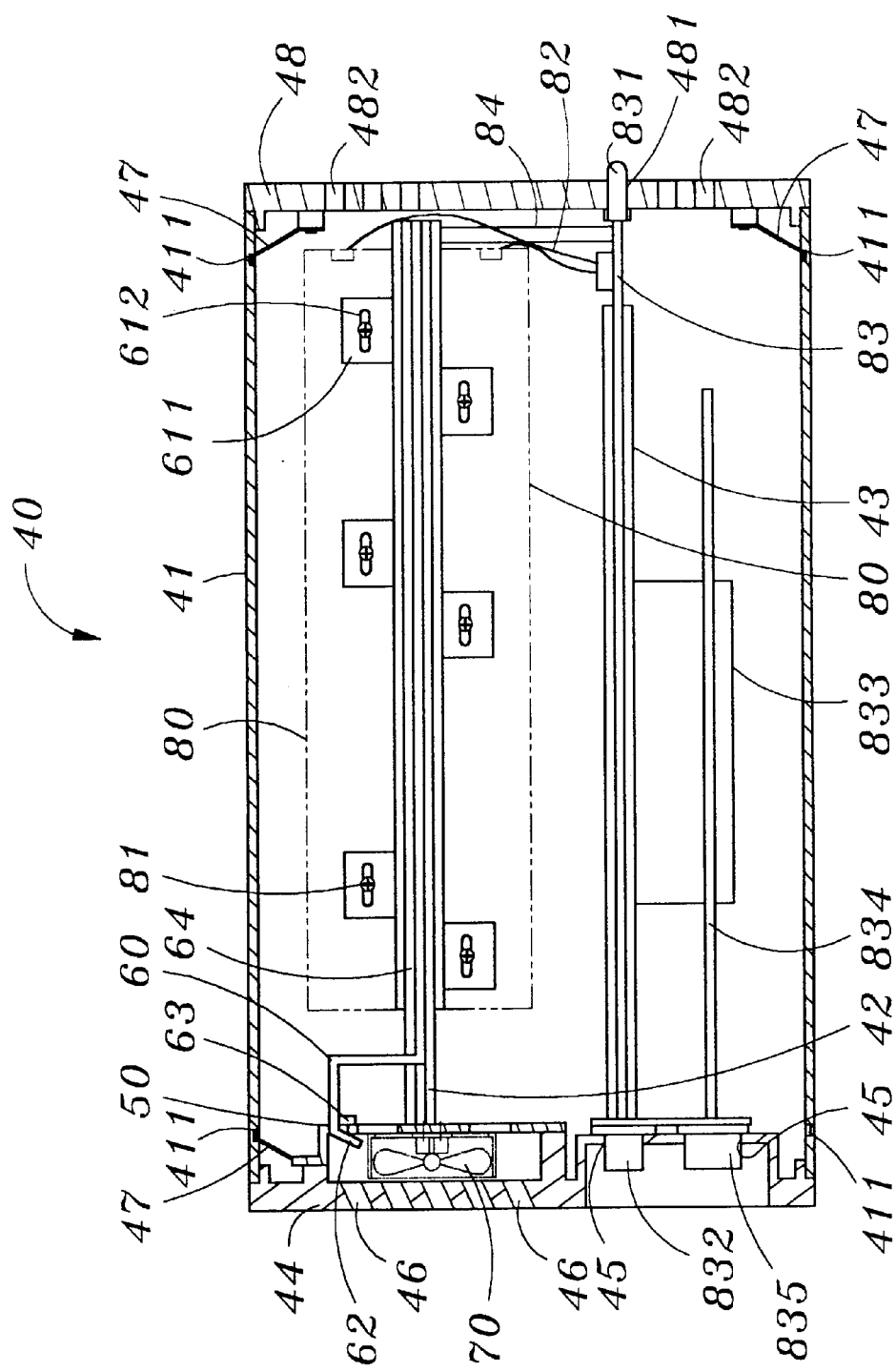
FIG. 4 shows a preferred embodiment of the present invention.

Please refer to FIG. 4. The lateral sides of two disk drives 80 are secured to the vertical board 611 of the hard disk drive frame 60 by screws 81; the two disks 80 are electrically coupled to the motherboard 83 via the bus 82; a fixing post 84 is disposed between the hard disk drive frame 60 and the motherboard 83 to assure the secure coupling between the two. An illuminating member 831 is disposed at one end of the motherboard 83, and the illuminating member 831 is located in back of the light guiding post 481 on the front panel 48 (the illuminating member for this embodiment is a set of LED, however the skill of the art can substitute it with other components). The I/O ports 832 of different functions such as the USB port, network port, VGA display port, and PS/2 mouse, etc are disposed on the other end of the motherboard 83. Under the motherboard 83, there is a connection slot 833 for receiving the parallel insertion of an interface card 834 (such as display card, sound card, network card, etc) of other functions. The I/O port 835 at the front end of the interface card 834 is secured to the opening 45 at the back panel 44, and a fan 70 with dynamic force is mounted on the fan frame 50 such that when the fan 70 is turned on, the heat generated from the motherboard 83 and disk drive 80 are discharged via the ventilation hole 46 by the fan 70, and allows the cold air outside from the inlet 482 at the front board 48 to enter for refill.

Figure 5:
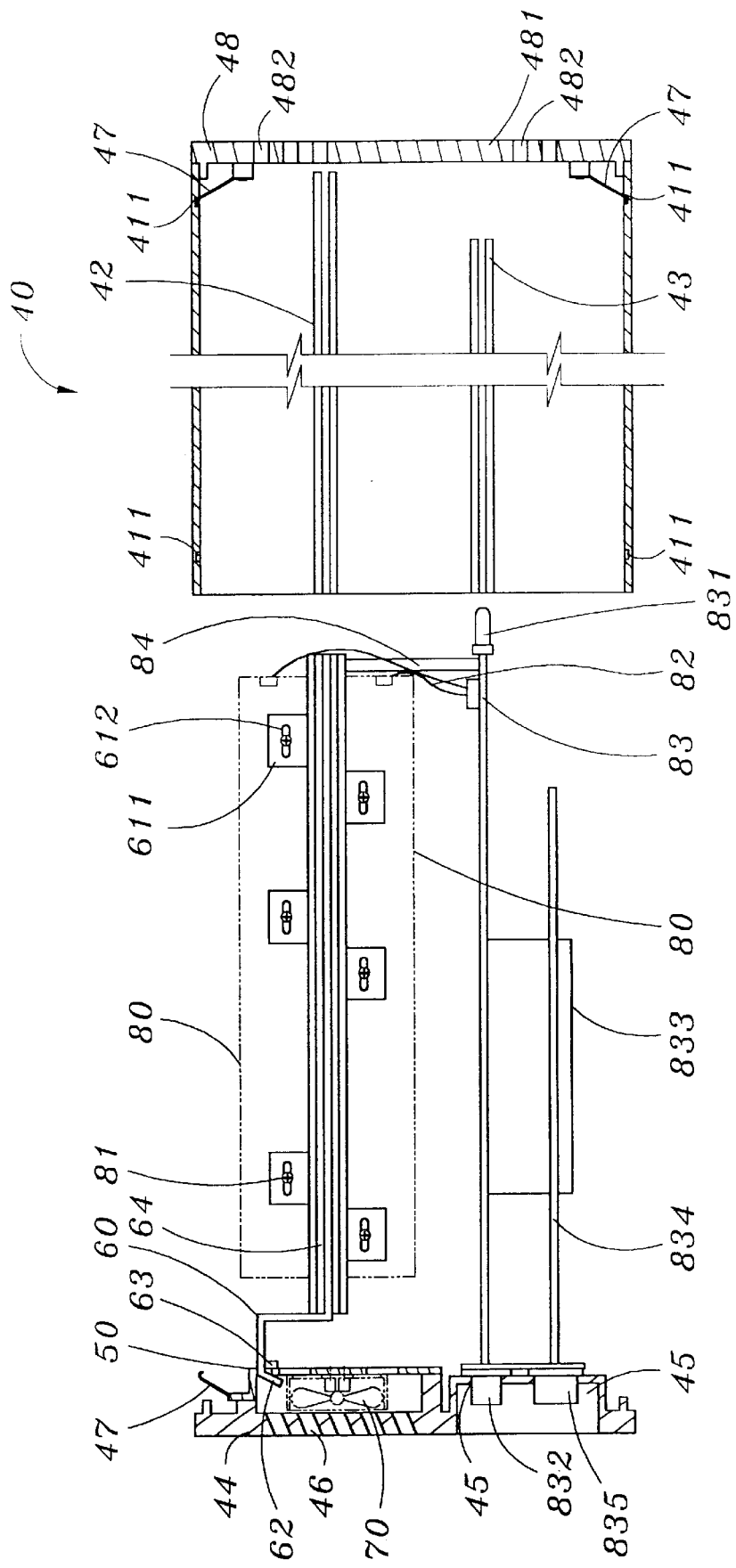
FIG. 5 shows the hard disk drive and motherboard before they are installed into the casing according to a preferred embodiment of the present invention.

Please refer FIG. 5. The screwing components 81 passing through the long hole 612, and the hard disk drive 80 is screwed to the vertical board 611, and a parallel interface card 834 is inserted the connection port 833 of the motherboard 43. A fixing post 84 is disposed between the screw hole 65 at one end of the horizontal surrounding board 61 and the motherboard 83, and an inclined board 62 of the hard disk drive frame 60 is inserted into the penetrating hole 51 of the fan frame 50 and allows the panel 63 at the front end of the hard disk drive frame 60 presses against the fan frame 50 at a fixed angle so that the I/O port 832, 835 on the motherboard 83 and the interface 834 passes through and latches to the opening 45 at the back panel, and the sliding track 64 at lateral sides of the hard disk drive 60 aligns the sliding track 42 of the external casing 41, and the motherboard 83 aligns the sliding groove 43 and presses the elastic latch 47 into the external casing 41, and then the whole structure of the hard disk drive frame 60 and the motherboard 83 is pushed into the sliding track 42 and the sliding groove 43 of the casing 40. The sliding track 42 can evenly support the substantial weight of the hard disk 80 of the hard disk drive frame 60, and the sliding groove 43 can support the substantial weight of the motherboard 83. Finally, the elastic latch 47 can securely latch the latch groove 411 in position and prevents the back panel 44 from falling out of the casing 41.

Figure 6:
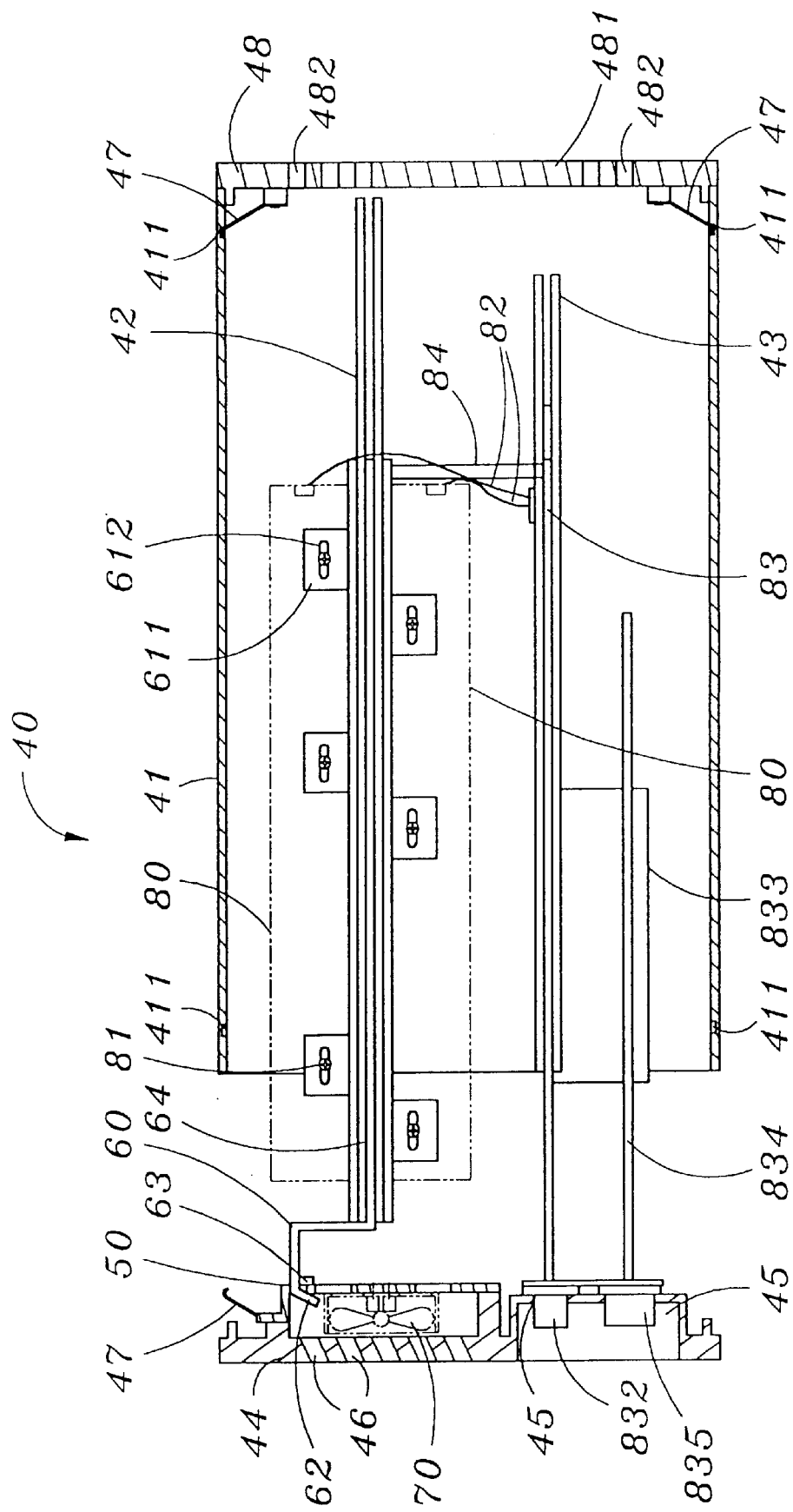
FIG. 6 shows the hard disk drive and motherboard after they are installed into the casing according to a preferred embodiment of the present invention.

Please refer to FIG. 6, which continues the action of the previous diagram. When the maintenance person intends to maintain or repair or replace components, he/she can hold the external casing 41 with one hand, and pull the back panel 44 with the other to force the spring latch 47 to separate from the restriction of latch groove 411 so that the hard disk drive 80 on the sliding track 42 and the motherboard 83 on the sliding groove 43 can be pulled out together to facilitate the maintenance and repair of the hard disk drive 80 and the motherboard 83, and the like in the casing 40. When putting the components back into the position, its fixing method for the front panel 48 or back panel 44 and the external casing 41 is unchanged.

Therefore, in summation of the above description, the present invention has at least one set of sliding track on the lateral sides for adopting a hard disk drive frame and at lease one set of sliding groove for adopting a motherboard. The casing proximate to the end surface of the inner edge has a latch groove for latching the elastic latch at the periphery of the back panel of the casing, and it provides a quick way to assemble and dissemble the casing for maintenance and repair. This improved structure is the research and development subject for enhancement. The inventor of the present invention based on years of experience in the related industry conducted extensive research to enhance the structure of the storage rack herein which is hereby submitted for patent application.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A snap-in computer casing structure, comprising:

a casing, further comprising an external casing which has at least one set of sliding tracks and sliding grooves on different planes, and a back panel being disposed at one end of the external casing, the back panel having an opening and a ventilation hole, and an elastic latch being disposed on the periphery of the back panel, and the external casing proximate to the end of the inner edge has a latch groove corresponsive to the elastic latch so that the back panel can be latched to the latch groove and coupled to the external casing;

a fan frame, being mounted on the ventilation holes of the back panel, and having an opening; and a hard disk drive frame, being disposed on the fan frame, and having an inclined board at the front end of the hard disk drive frame, and the inclined board is inserted into the opening of the fan frame, and both sides of the hard disk drive frame are extended to the sliding track which is capable of sliding on the sliding groove, and the hard disk drive frame has a fixing post;

by such arrangement of said components, the hard disk is mounted on the hard disk drive frame, and by the coupling of the fixing post, the hard disk drive and the motherboard are coupled together, and after the hard disk drive and the motherboard are electrically coupled, the sliding tracks on both lateral sides of the hard disk drive frame align at the sliding track of the external casing, and the motherboard aligns at the sliding groove so that the hard disk and the motherboard can be pushed into the interior of the casing in a quick manner.

2. A snap-in computer casing structure as claimed in claim 1, wherein said hard disk drive frame forms a vertical board with a hollow section being horizontally extended downward, and a horizontal surrounding board is extended from the rear of the vertical board, and a corresponding vertical board being disposed at the upper and lower section of the horizontal surrounding board for securing the disk drive by screwing members.

3. A snap-in computer casing structure as claimed in claim 1, wherein said hard disk drive frame has a panel in its front end, and the panel presses against the fan frame with a fixed angle.

4. A snap-in computer casing structure as claimed in claim 1, wherein said motherboard has a slot for receiving the parallel insertion of interface card.

5. A snap-in computer casing structure as claimed in claim 1, wherein said fan frame has a fan on it.

* * * * *